United States Patent [19]

Bergman et al.

[11] Patent Number: 5,303,237
[45] Date of Patent: Apr. 12, 1994

[54] FRAME RELAY SYSTEM CAPABLE OF HANDLING BOTH BOICE AND DATA FRAMES

[75] Inventors: William C. Bergman, Raleigh; Janakirama R. Cherukuri, Chapel Hill, both of N.C.

[73] Assignee: International Business Machines Corporation, Armonk, N.Y.

[21] Appl. No.: 923,713

[22] Filed: Jul. 31, 1992

[51] Int. Cl.⁵ ............................................. H04J 3/24
[52] U.S. Cl. .................................. 370/85.6; 370/94.1; 370/94.2; 370/110.1
[58] Field of Search ................ 370/13, 17, 60, 60.1, 370/94.1, 94.2, 95.1, 105.1, 110.1, 85.6; 371/37.1, 37.7, 47.1

[56] References Cited

U.S. PATENT DOCUMENTS

| 4,577,314 | 3/1986 | Chu et al. | 370/110.1 |
| 4,581,735 | 4/1986 | Flamm et al. | 370/94.1 |
| 4,665,514 | 5/1987 | Ching et al. | 370/94.1 |
| 4,800,559 | 1/1989 | Florea et al. | 370/94.1 |
| 4,813,040 | 3/1989 | Futato | 370/110.1 |
| 4,991,133 | 2/1991 | Davis et al. | 370/94.1 |
| 5,072,449 | 12/1991 | Enns et al. | 370/94.2 |

*Primary Examiner*—Douglas W. Olms
*Assistant Examiner*—Alpus H. Hsu
*Attorney, Agent, or Firm*—Gerald R. Woods

[57] ABSTRACT

Modifications to existing frame relay communication protocols are described which permit both voice and data frames to be handled in an integrated frame relay system. A Voice Frame Identifier bit is defined in the address field of a frame. When an intermediate node detects a voice frame, a CRC operation is performed using only the frame header; that is, voice information is excluded from the computation. The frame is flagged for priority processing in the node. When the intermediate node detects a data frame the CRC operation uses both the header and the data fields.

4 Claims, 5 Drawing Sheets

EN-END NODE
NN-NETWORK NODE

FRAME RELAY SYSTEM CAPABLE OF HANDLING BOTH BOICE AND DATA FRAMES

FIELD OF THE INVENTION

The present invention relates to frame relay communication systems and more particularly to a frame relay communication system capable of handling both digital data and voice packets.

BACKGROUND OF THE INVENTION

It is frequently said that the world has entered an information era. Huge quantities of information are already being transmitted through extensive electronic networks on an almost instantaneous basis to satisfy voracious appetites of businesses and individuals for knowledge. There is nothing that indicates that those appetites will stabilize or diminish in the near future. The expectation is that they will grow stronger.

The information that flows through such networks can, of course, be classified in many ways. One possible classification has to do with whether the information can safely be delayed as it passes through the network. Real time information, including voice or video information, is information that cannot readily be delayed in transit without degrading the quality of the information presented to an end user at an ultimate destination. Non-real time information, including digital data representing alphanumeric or graphical information, is information that can be delayed without necessarily degrading the quality of the information presented to an end user at the destination.

For purposes of convenience, real time information will be identified as voice information or just voice. Non-real time information will be referred to as data. It should be recognized that the word "data" is not being used in its most generic sense; that is, to represent any kind of information in any form. For purposes of this description, the term is limited to non-real time information, usually representing alphanumeric information. It should also be recognized that both voice and data can be encoded using known digital encoding techniques and can be transmitted through digital communication networks.

While voice information is delay intolerant, it is fault tolerant. That is, bit errors introduced as the voice information is being transmitted through the network may not have a significant effect on reproduction quality when the voice information reaches its destination. Data, on the other hand, while delay tolerant, is fault intolerant. Bit errors introduced as the data is being transmitted through the network may result in the data being so corrupted as to be unusable at its destination.

Because voice and data place different demands on communications networks, different kinds of networks have typically been used to transmit the two types of information.

One kind of network that has been developed, primarily for transfer of data between end users, is a frame relay network. In a frame relay network, data is segmented into discrete units or packets which are transmitted in succession along a selected data path through the network. At the receiving end of the data path, the packets are combined to reproduce the data stream which entered the network at the transmitting end. In frame relay systems, the throughput of the system is increased by performing relatively little error checking at the intermediate nodes. If extensive error checking is to be performed, it is performed at the destination.

Data frame relay systems follow protocols established by international standards, such as current ANSI standards T1.617 and T1.618 and CCITT Recommendations Q.922 and Q.933. Systems which follow such standards are optimized for handling of data. Voice information, with its different characteristics and requirements, cannot adequately be supported in data frame relay systems, as presently implemented.

SUMMARY OF THE INVENTION

The present invention is modification of the protocols employed in a known data frame relay system to permit multimedia (voice and data) traffic to be supported in an integrated frame relay system.

The invention is a frame relay communication system capable of transmitting both digital data packets and digitized voice packets through a network having a plurality of nodes interconnected by communication links. At least one of the nodes in the system includes means for receiving a frame on an incoming link. The node further includes means for differentiating between voice and data frames. If a frame is a voice frame, means at the node perform an integrity check only on certain fields in the frame. Data fields are excluded from the integrity check. If the frame is a data frame, data fields in the frame are included in the integrity check.

BRIEF DESCRIPTION OF THE DRAWINGS

While the specification concludes with claims particularly pointing out and distinctly claiming that which is regarded as the present invention, further details of a preferred embodiment of the invention may be more readily ascertained from the following technical description when read in conjunction with the accompanying drawings wherein:

TECHNICAL DESCRIPTION

Figure 1:
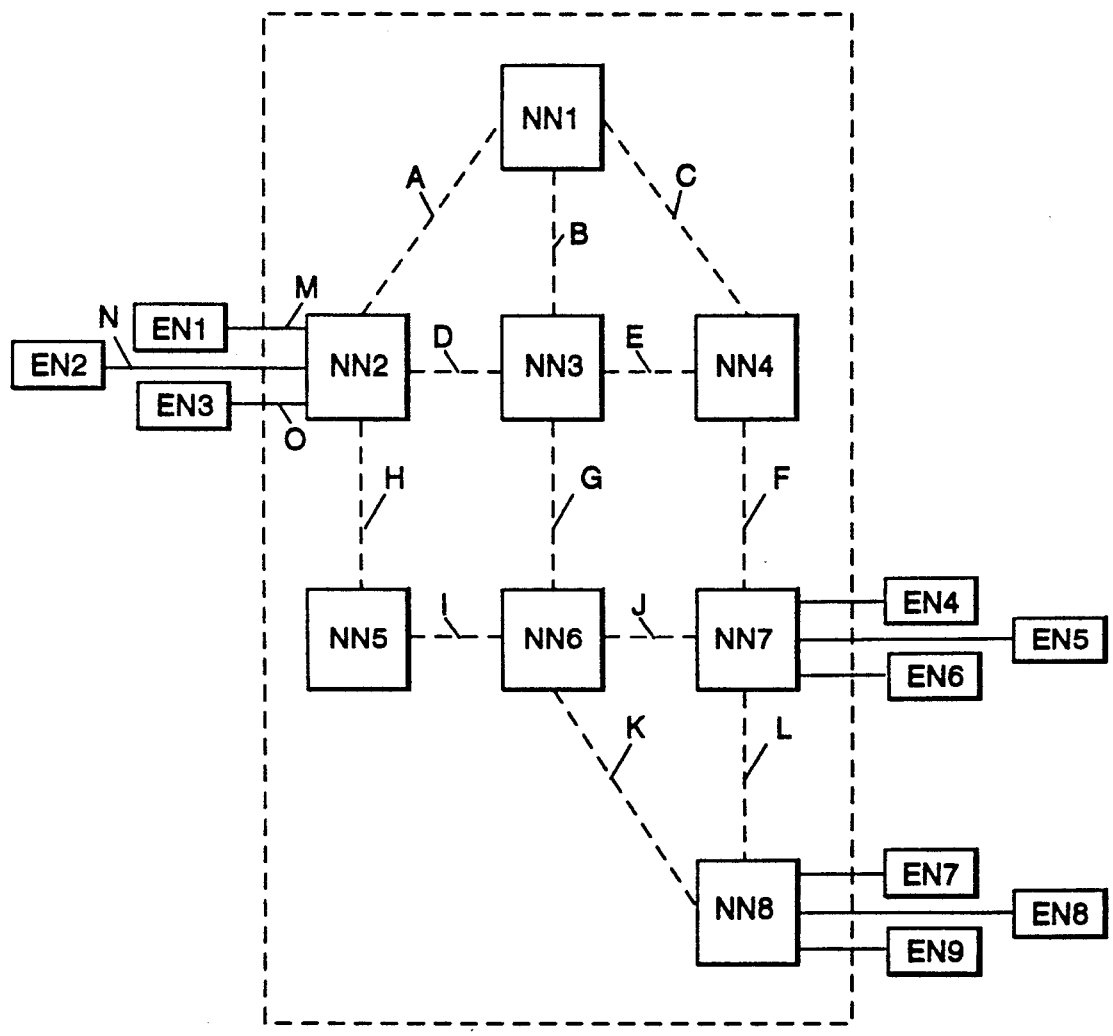
FIG. 1 is a block diagram representing a communications network within which the present invention may be practiced.

FIG. 1 represents a communications network having eight network nodes NN1 through NN8. Each of those nodes is linked to at least one other node through one or more communications links, such as links A through L. Each communications link may be either a permanent connection or a selectively enabled connection. Network nodes NN2, NN7 and NN8 are shown with attached end nodes EN1 through EN9. In a typical network, other network nodes would have one or more attached end nodes.

The network nodes NN1 through NN8 are data processing systems that provide certain communication services for their own end nodes and for other network nodes. The communication services include, among other things, the selection of communication routes between nodes, directory services and the maintenance of a network topology database.

In any data communication system, data originating with a first end user is transferred to a second end user along a data path that may include multiple network nodes and links. In many types of systems, extensive error detection is performed at each of the network nodes on the path. If an unrecoverable error is detected at the node, the data unit is discarded. In a frame relay system, on the other hand, only limited error checking is performed at the intermediate nodes. Extensive error checking is performed only at the destination node.

Figure 2:
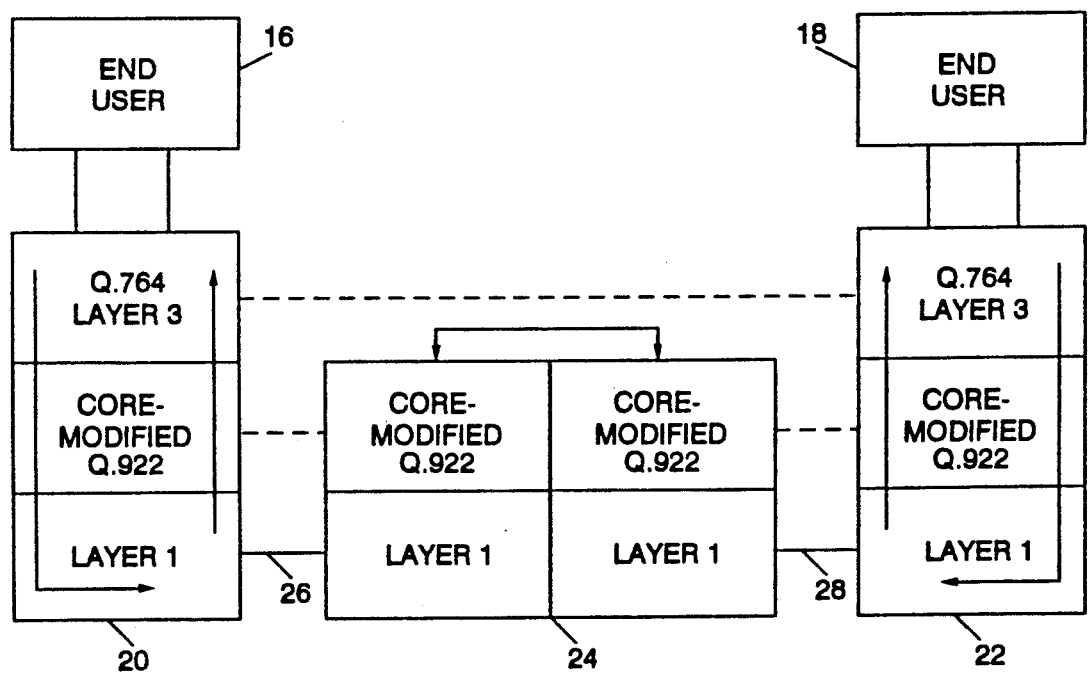
FIG. 2 illustrates a user plane protocol stack required to support voice packet transfer in a frame relay network.

FIG. 2 represents protocol stacks which would permit both voice and data packets to be transferred between end users 16 and 18 through a communications network of the type described. Assuming a packet originates with end user 16, the packet is transferred at the originating node from higher level layers in a stack 20 toward the lower level layers of the stack. While the stack normally includes more layers, only layers 1 through 3 are illustrated. In each protocol layer, certain functions are performed on the packet, primarily to support transmission of the packet through the network. The exact functions that are performed are set forth in international standards. For example, Layer 3 functions are defined by an ISO Standard and CCITT Recommendation ana relate primarily to packetization of voice or data information.

Layer 2 functions are referred to as core functions and are defined, in part by CCITT Recommendation Q.922. Basic core functions at a transmitting node include establishing frame boundaries and alignment through addition of flag bytes, performing zero bit stuffing (adding a '0' after five successive '1' bits in a data field), multiplexing of frames using the frame address field, and inspecting the frame to see that it has an integer number of octets prior to zero bit stuffing and that it is neither too long or too short.

When a frame to be transmitted has been processed in Layer 2, it is passed to Layer 1, the physical layer at which it is actually transmitted through the system. The frame is then transmitted toward an intermediate network node 24 over a communications link 26.

Network node 24 is shown as having an incoming and an outgoing physical layer, each of which is supported by a Layer 2 or core function layer. The core function layer is described in the drawing as being a modified core layer. The modifications, which will be described in detail later, are those required to support transmission of voice and data packets in the same frame relay system. From a logical viewpoint, an incoming frame at a network node passes from incoming Layer 1 through incoming Layer 2 functions to outgoing Layer 2 functions and then to outgoing Layer 1.

The outgoing frame is then passed through a communications link 28 to a protocol stack supporting end user 18. While only a single network node is shown, there would typically be multiple network nodes arranged in series between the two end user protocol stacks.

At the destination node, core functions, which are the inverse of those described above, are performed on the packet as it passes through successively higher protocol layers. For example, in Layer 2 at the destination node, the data fields are examined and any '0' which follows five successive '1' bits is removed in a "destuffing" operation. The "destuffing" operation is intended to re-establish the original data stream.

Figure 3:
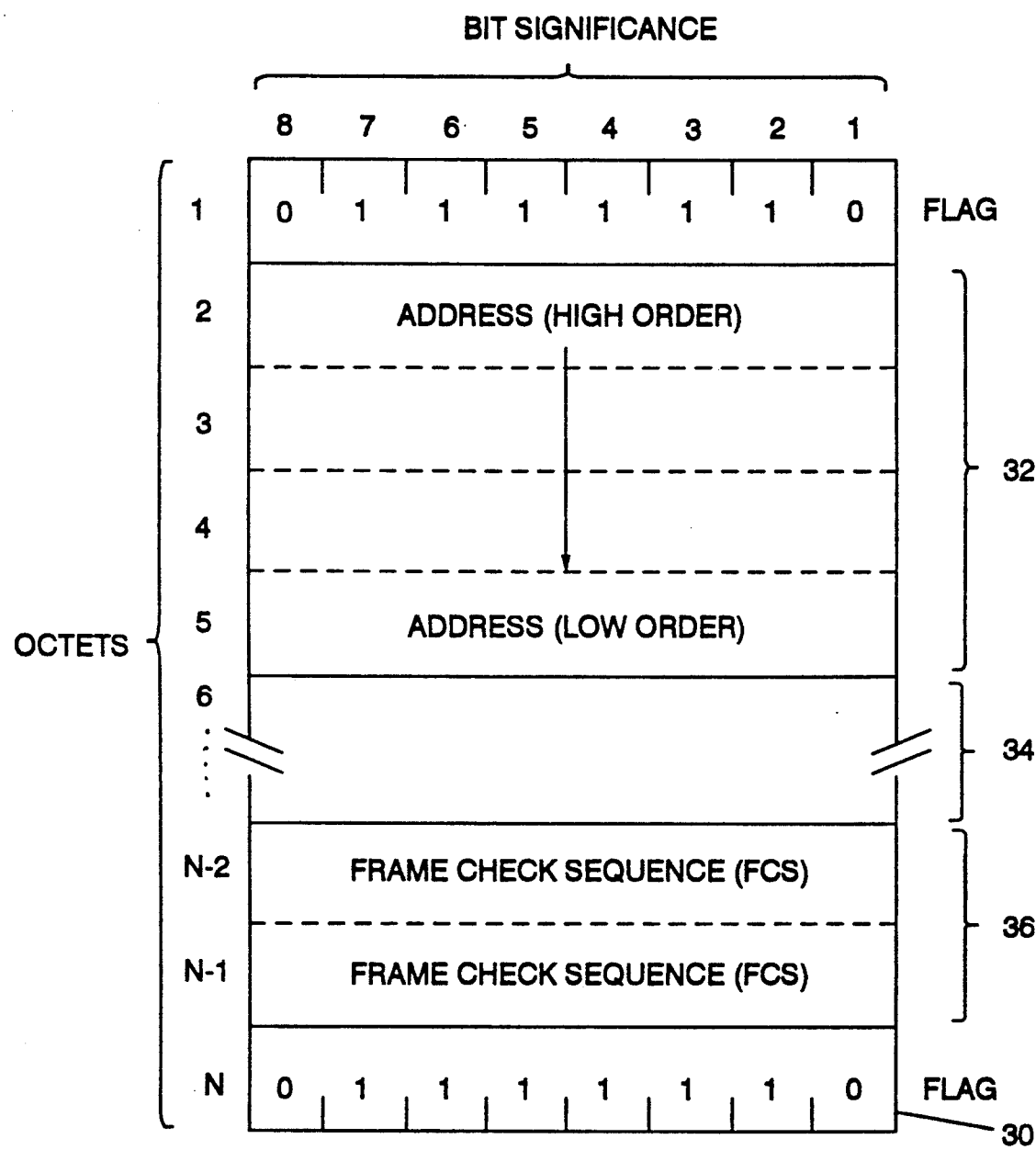
FIG. 3 shows the general field format of a frame which can be transferred through a frame relay network.

FIG. 3 shows the general field format for a frame used in a frame relay system. The frame has a variable number of eight bit bytes or octets. The binary value or significance of each bit in an octet is a function of its position within the octet, with the most significant bit being at the beginning of the octet. The frame-bounding octets 30 are an opening/closing flag byte comprising a '01111110' binary or '7E' hexadecimal character.

The opening flag 30 is followed by a set 32 of address octets. According to existing, conventional frame relay standards, each frame may have from two to four address octets with the highest order octet occurring first in the frame. When a frame carrying voice information is presented to the network at the interface between an end node and a network node, the frame may have a two byte address format. In accordance with the present invention, four address octets are required for processing of a voice frame at a network node. Where additional address octets are required, those octets (which will include a voice frame indicator) must be added by the network node at the interface based on call setup or subscription options which precede the frame. The address octets are followed by a field 34 having a variable number of octets representing either data or voice information. The last non-flag field in the frame is a two byte field 36, representing a sixteen bit frame check sequence character. The frame check sequence character is used to check the integrity of the frame and is computed differently, depending on whether the frame contains voice or data.

Figure 4:
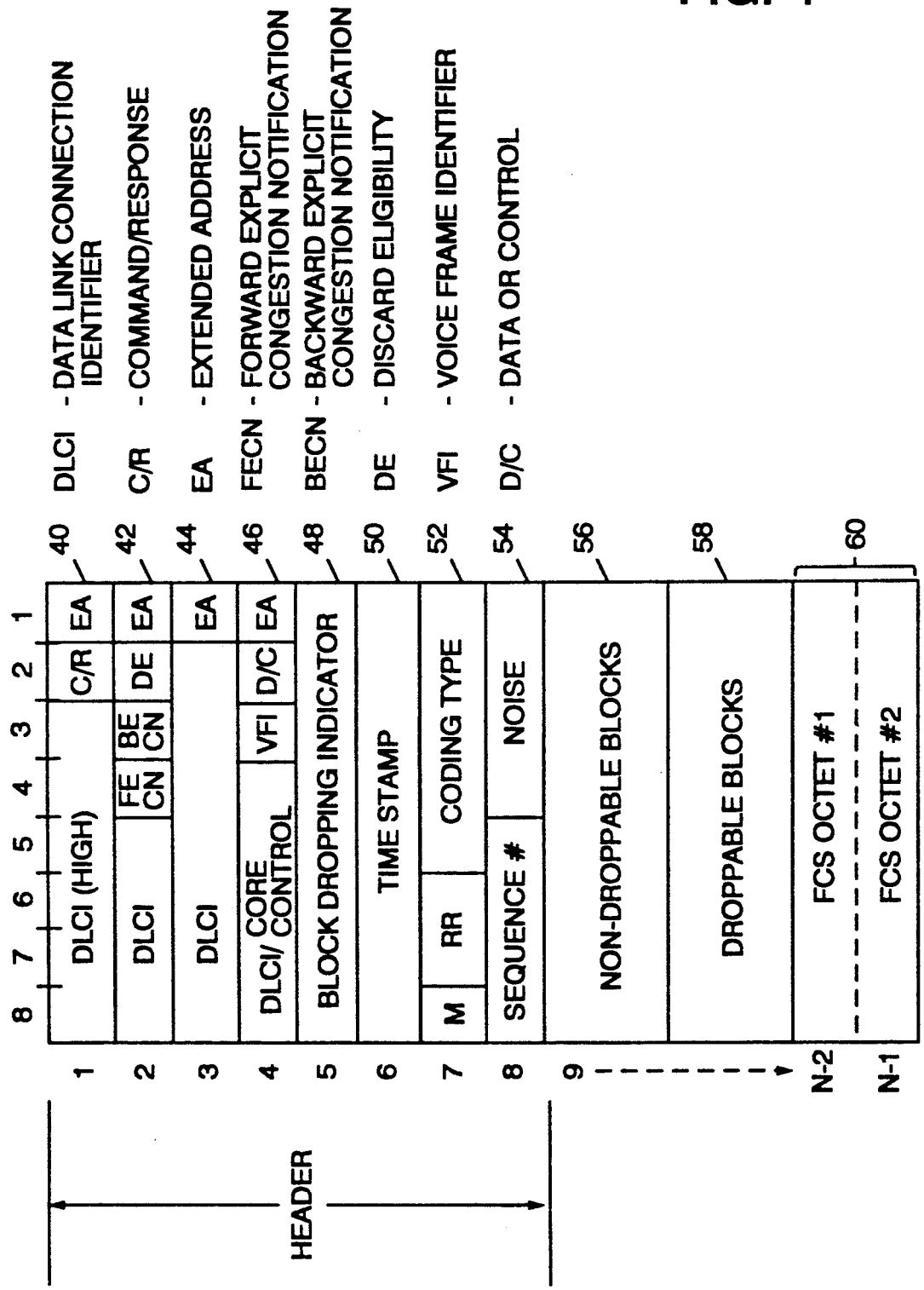
FIG. 4 shows the field format of a voice packet frame which can be transferred through a frame relay network.

Details of the described frame structure are shown in FIG. 4 with the opening/closing flags being omitted. As noted earlier, four address octets 40, 42, 44 and 46 are required by the present invention for a voice frame being processed at a network node. The address or Data Link Connection Identifier (DLCI) information is spread over the octets with certain bits in each octet being dedicated to other non-address information.

More specifically, bit 2 of octet 40 is a Command/Response (C/R) bit which an end user can set to indicate whether the frame represents a command or a response. Bit 1 of each of the address octets is an Extended Address (EA) bit. The value assigned to this bit indicates whether the following octet is also an address octet. In the illustrated frame, the EA bit for octets 40, 42 and 44 would have one binary value while the F-A bit for octet 46 would have the opposite binary value.

Octet 42 includes four DLCI bits, a Forward Explicit Congestion Notification or FECN bit, a Backward Explicit Congestion Notification or BECN bit and a Discard Eligibility or DE bit in addition to the EA bit mentioned earlier. The FECN and BECN bits can be set by a node to indicate congestion avoidance procedures may be required for frame traffic moving in the direction of a frame having a set FECN bit or in the opposite direction of a frame having a set BECN bit. The value of the DE bit in the octet indicates whether the particular frame should be discarded in preference to other frames being transmitted.

Octet 44 is a simple octet containing seven bits of DLCI information and the single EA bit. Octet 46 is more complicated. It contains a six bit DLCI/Core Control field which can contain either additional DLCI information or control data used to control core functions performed at the node, a Data/Control indicator (D/C) and an EA bit. The contents of the six bit field are interpreted as a function of the value of the D/C bit. When the six bit field represents control information, bit 3 of the octet is a Voice Frame Identifier (VFI) bit, the value of which indicates whether the frame is a data frame or a voice frame. As will be indicated later, the manner in which the frame is processed at the node differs depending on whether the frame has been identified as a voice frame by the VFI bit.

The structure of the remainder of the frame depends on whether the frame carries data or voice information. The illustrated frame structure is one suitable for carrying voice information. The contents of the frame beginning with the fifth octet (octet 48) generally conform to CCITT Recommendation Q.764 for packetized voice. The contents will be described briefly below. Further details can be obtained from the CCITT Recommendation. If the frame were to be used for data, the contents of the same set of octets would conform to the requirements of the ISO Standard and CCITT Recommendation applicable to packetized data.

Voice information is carried in two separate fields, consisting of multiple blocks of voice information. Field 56 contains critical or non-droppable blocks of voice information. If the contents of all or a significant part of field 56 were to be discarded during transmission, a serious loss of voice quality would occur at the destination. Field 58 contains less critical or droppable blocks. Loss or some or even all of information in the blocks in field 58 would still provide usable voice quality output at the destination although voice subtleties, such as inflections or intonations might be degraded. The number of droppable blocks is a function of the type of voice encoding algorithm used. A Coding Type field in octet 52 indicates the type of algorithm used in encoding the voice information. This information is needed at the destination to select an appropriate decoding algorithm.

Octet 48 in the frame is a Block Dropping Indicator octet. Certain bits in the octet will be encoded to indicate the total number of blocks that can be dropped from field 58 if congestion is encountered. Other bits in the octet will indicate the remaining number of blocks that can be dropped. The value of the latter bits will, of course, depend on how many blocks have already been dropped in the course of transmission. Block Dropping is ordinarily a Layer 3 procedure that is performed only at origin and destination nodes and not at intermediate network nodes.

Octet 50 is a Time Stamp field which can record the cumulative variable queuing delays experienced by a frame in traversing the network.

The function of the Coding Type field in octet 52 has already been mentioned. It should be noted that this field is encoded at the origin and is not subject to change during transmission. Octet 52 also includes two presently reserved bits RR and a non-modifiable M-bit set by the user in accordance with CCITT Recommendation Q.764.

Octet 54 contains a Sequence # field which is set by the user to indicate packet or frame sequence and a Noise field. The Noise field is also set by the user and generally indicates the type and level of background noise that should be generated to fill "dead" space that might otherwise occur in the reconstructed voice.

The frame ends with a two byte Frame Check Sequence or FCS field 60. The packet fields used for computation of the FCS field depends on whether the frame is a voice frame or a data frame. This is discussed in more detail below.

Figure 5:
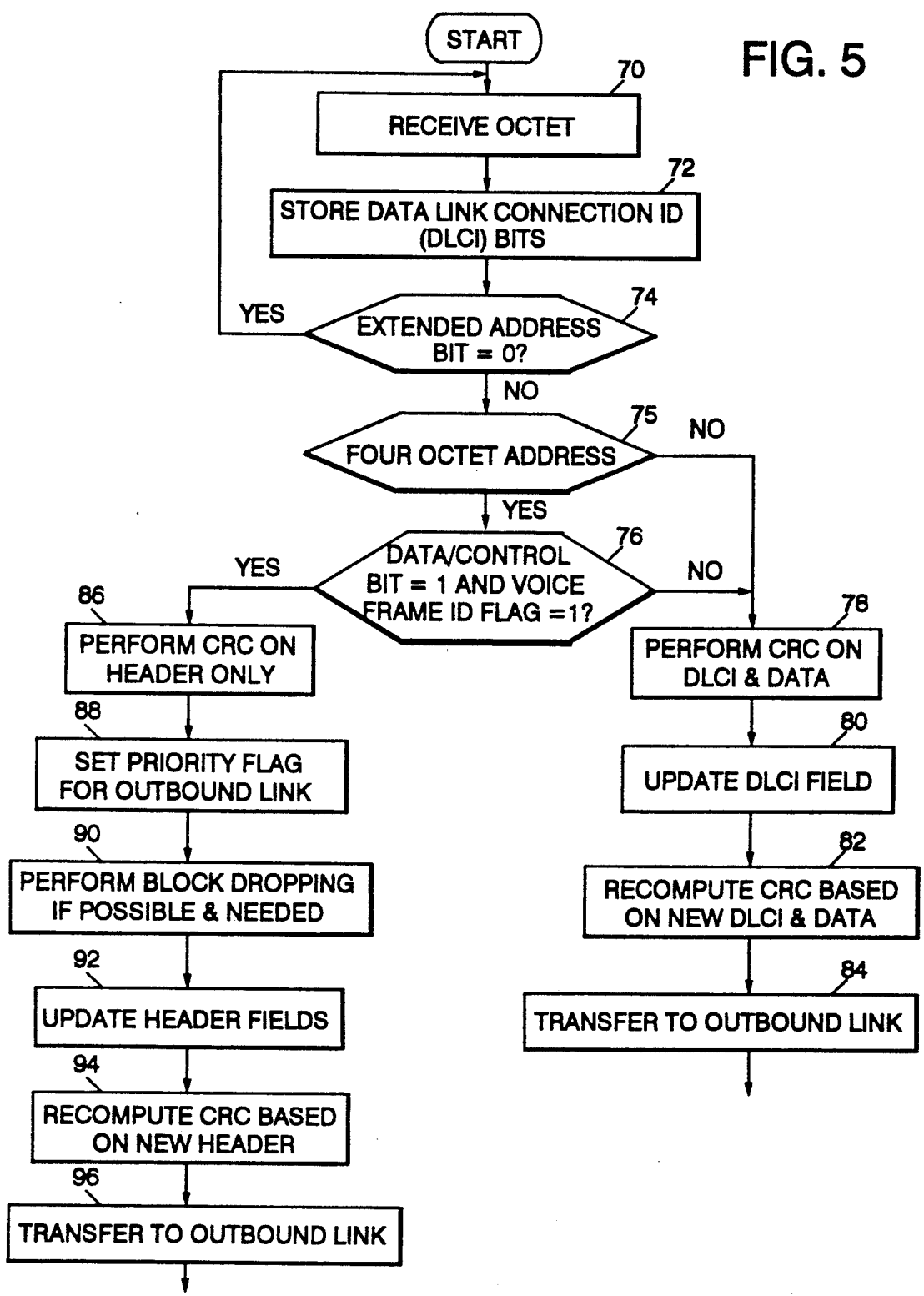
FIG. 5 is a flow chart of steps that are performed at a node in an integrated frame relay system when receiving a frame that could be either a voice packet or a data packet.

FIG. 5 is a flow chart of operations that are performed at an intermediate, network node in an integrated frame relay system when receiving a frame. After a frame is received in an initial operation 70, address or DLCI information is extracted from the current octet and stored in operation 72. The Extended Address bit of the current octet is read in an operation 74. A '0' value indicates additional address octets remain to be read. The loop consisting of operations 70, 72 and 74 is repeated until an Extended Address bit having a '1' value is encountered, indicating the end of the address field.

Since existing standards permit the address field to be two to four octets in length, a check 75 is made to determine whether four address octets have been found. If less than four address octets are found, the frame must be a data frame and a series of operations (to be described later) unique to data frames are initiated. If the frame does have four address octets, however, it is not necessarily a voice frame. To detect a voice frame, an operation 76 actually performs two successive steps. First, the value of the D/C bit is checked to determine whether the six bit DLCI/Core Control field contains address or control information. If the field contains control information, then the VFI bit in the is field is checked to see whether a voice frame has been identified. If either test fails, the frame is treated as a data frame.

In processing a data frame in an integrated frame relay system, each intermediate node checks the integrity of the frame by performing a conventional Cyclical Redundancy Check or CRC operation 78 on certain fields in the frame. For a data frame, both the DLCI octets and the data field are included in the CRC operation. Assuming the CRC operation does not indicate an error has occurred and after other conventional processing has been performed, the DLCI octets are updated in operation 80 to identify the next link on which the frame is to be sent. A new CRC field is computed in operation 82 based on the new DLCI information and the original data. The data frame is transferred, in operation 84, to the identified outbound link for the next hop on the path toward its ultimate destination.

If operation 76 had identified a voice frame, the frame would have been processed differently. As shown in block 86, the CRC operation would have been limited to fields in the frame header. Given that voice information is error tolerant, it is not essential that the integrity of the voice information fields be checked.

Further, when a frame is identified as a voice frame, a priority transmission flag is set in the node in operation 88 to assure that high priority is given to further processing of the frame. If the node is one that is capable of performing Block Dropping, as described above, and if Block Dropping is called for as a result of congestion in the network, a block dropping operation 90 is performed before the header is updated in an operation 92 to reflect the new DLCI information and any changes in changeable subfields in the header, such as the time stamp or the block dropping indicator. A new CRC field is then computed in operation 94 based on the new header. The frame is transferred to the identified outbound link in operation 96.

While there has been described what is considered to be a preferred embodiment of the invention, modifications and variations therein may occur to those skilled in the art once they become acquainted with the basic concepts of the invention. Therefore, it is intended that the appended claims shall be construed to include both the preferred embodiment and all such variations and modifications as fall within the true spirit and scope of the invention.

We claim:

1. A frame relay communication system capable of transmitting both digital data frames and voice frames, said system comprising a plurality of nodes interconnected by communication links, at least one of said nodes including:

means for receiving a frame on an oncoming link;

means for detecting whether said frame is a digital data frame or a voice frame;

means responsive where said frame has been identified as a voice frame to perform an error checking operation only on a first set of fields of the frame, said first set of fields excluding data fields, said means being responsive to said frame having been identified as a data frame to perform an error checking operation on a second set of fields, said second set of fields including data fields.

2. A frame relay communication system as defined in claim 1 further including means responsive to a frame having been identified as a voice frame to further identify the frame as one which should be placed in a high priority output queue.

3. In a frame relay communication system comprising a plurality of nodes interconnected by communication links, a method of processing both digital data frames and voice frames in at least one node comprising the steps of:

receiving a frame from an incoming link;

identifying the frame as a voice frame or a data frame;

if the frame is a voice frame, performing an error check only on a first set of fields in the frame, said first set of fields excluding data fields; and if the frame is a data frame, performing an error check on a second set of fields in the frame, said second set of fields including data fields.

4. A method as defined in claim 3 further including the step of identifying the frame as one which should be placed in high priority output queue where the frame has been identified as a voice frame.

* * * * *

UNITED STATES PATENT AND TRADEMARK OFFICE
CERTIFICATE OF CORRECTION

PATENT NO. : 5,303,237
DATED : April 12, 1994
INVENTOR(S) : Bergman and Cherukuri It is certified that error appears in the above-identified patent and that said Letters Patent is hereby corrected as shown below:

On the title page, item [54] and in column 1, line 3, in the title change "BOICE" to read --VOICE--.

Signed and Sealed this

Thirtieth Day of August, 1994

Attest:

BRUCE LEHMAN

Attesting Officer

Commissioner of Patents and Trademarks